Patented Nov. 3, 1942

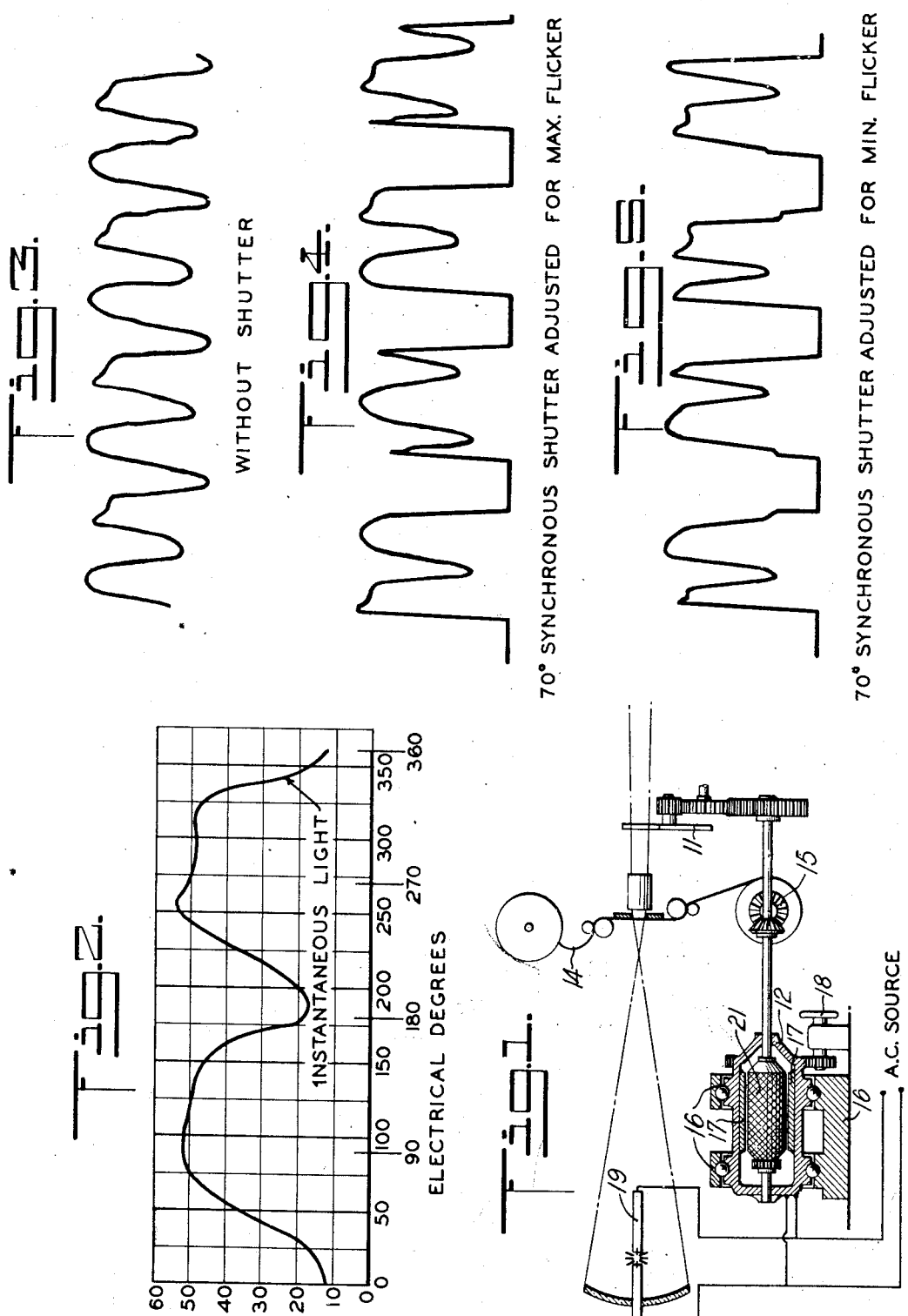

2,300,484

UNITED STATES PATENT OFFICE 2,300,484

MOTION PICTURE PROJECTION SYSTEM

Frederick T. Bowditch, Lakewood, and Paul A. Marsal, Rocky River, Ohio, assignors to National Carbon Company, Inc., a corporation of New York Application July 15, 1939, Serial No. 284,592

6 Claims. (Cl. 88—18)

The invention relates to a motion picture projection system, particularly one operable with a light source of pulsating or periodically varying intensity, and includes an improved means for reducing or eliminating flicker in the projected light from such a system.

The essential elements of a projection system for motion pictures comprise a light source, a film track with associated film moving mechanism, a shutter or device for alternately intercepting and passing the projected light and, of course, an optical system to provide the required projection. A conventional type of shutter is a rotating member having open and closed portions which may constitute four equal segments, each of 90°, where open and closed periods of equal length are desired. The shutter is rotated in a definite synchronism with the frame movement of the picture film. In present practice a 35 mm. sound film is projected at the rate of 24 frames per second, and considering each frame projection as a cycle, the shutter operates with the following sequence: (1) as the projection of one frame is completed, a shutter blade moves across the light beam, darkening the screen for a time sufficient to permit the next frame to be moved into position for projection; (2) the blade then passes out of the beam, permitting the light to project an image of the new frame on the screen; (3) a second shutter blade cuts across the beam while the film remains stationary in the aperture plate; and (4) the shutter opens permitting projection of the same frame for a second period, and the cycle is then repeated. With a steady light source, or one of substantially constant intensity, such as that provided by a direct current arc, the projected image on the screen, with the above shutter operation, appears continuous and free from flicker. On the other hand, if the light source is subject to cyclic variations in intensity, such as are encountered in all alternating current arcs, the matter of avoiding screen flicker is influenced by the time or phase relationship between the shutter openings and the light pulses or cyclic variations in light intensity, and objectionable flicker is a common occurrence, due to uneven screen illumination, or variation in amounts of projected light, with consecutive shutter openings.

Suggestions have heretofore been made in the art for avoiding or minimizing this flicker trouble, among which are the means disclosed in Patent 2,145,134 to J. E. Robin, granted January 24, 1939. In this patent it is proposed to raise the frequency of current alternation appreciably over that usually available commercial, and by including a number of complete light cycles within the time interval of each shutter opening, to improve thereby the average intensity of the projected light. Frequently changers are necessary in such a system, as are modifications in other parts of the projection apparatus. Another solution to the problem is possible by establishing a relationship between the current alternation and shutter rotation which will provide shutter opening periods of a frequency identical with, or a multiple of, the frequency of the light cycle. This again is not practicable, since the frequency of alternating currents as commercially supplied is not suitable to accomplish such relationship under the other required conditions, in which the shutter frequency must be timed with the picture film movement, and the latter has been more or less standardized by the motion picture industry at various frame movements for different sizes and types of films which are not simply related to commercial power frequencies.

The present invention offers another solution to this flicker problem, and the principal object is to provide a motion picture projection system with improved means adapting it to operation with a light source having a fixed cyclic variation in intensity. A further object is to provide a readily adaptable modification in a conventional projection system, whereby a steady projected light, free from objectionable flicker, may be obtained from a light source consisting of an alternating current arc.

In further explanation of the invention, and the advantages afforded thereby, reference will be made to the accompanying drawing, in which:

Figure 1 shows diagrammatically an embodiment of the essential features of the projection system of this invention, and Figures 2, 3, 4, and 5 are oscillograph curves of projected light under varying conditions to be hereinafter explained.

With an alternating current supplied to an arc, the current drops to zero, and the arc is practically extinguished twice in each cycle, or with a 60 cycle current 120 times each second. Thus the light intensity varies widely during each complete cycle. A typical single cycle of projected light from an alternating current arc is represented by the oscillograph curve of Figure 2, where light intensity in arbitrary units is plotted against a time axis in terms of electrical degrees, 360 electrical degrees being equal to one sixtieth of a second in the case of a 60 cycle source. In a sound film projection mechanism with a film movement of 24 frames per second, a 90° two bladed shutter (having two diametrically opposed openings of 90° each) is rotated once for each frame of the picture, or one revolution takes place in one twenty-fourth of a second. With a 60 cycle alternating current, one twenty-fourth of a second is equivalent to 900 electrical degrees, so that each open interval of a 90° shutter is equal to 225 electrical degrees. Unless provision is made to correlate or synchronize this open period with the electrical cycle, the shutter openings may occur over any region along the light cycle, and, as will be evident from the curve of Figure 2, the total quantities of light passed by successive shutter openings will vary appreciably, and sufficiently to produce a serious flicker. It has been found, for example, by actual test that over a projection interval in which the shutter opens at 90 electrical degrees and closes at 315 electrical degrees 19% more light is passed than during an equal interval opening at zero and closing at 225 electrical degrees.

In accordance with this invention the shutter rotating means is an adjustable one, whereby the shutter openings, or the intervals of projected light, can be caused to occur in a definite fixed phase relation to the light cycle. By synchronizing the shutter operation at the particular phase angle to the electrical cycle of the light source which produces a minimum variation in the quantity of light passed during successive projection periods, the system can be continuously operated with much reduced, or even with no discernible flicker. Figure 1 represents diagrammatically one manner of accomplishing this control. In the drawing a shutter 11 of conventional type is arranged to be operated by a synchronous motor 12 from the same power source as that supplying the light source. For sound film projection a motor of 1800 R. P. M. is suitable, with intermediate gearing to give a shutter rotation of 1440 R. P. M. The picture film travel is also controlled by the same motor, and through gearing 15 can be maintained at the desired frame speed, which for sound film is usually 24 frames per second, or one frame for each shutter revolution. The motor 12 is mounted in a standard 16, which permits rotation of the motor stator 17 with respect to the rotor 21. The stator 17 can thus be set, either by hand or through the medium of a small gear and hand wheel 18, at any desired angle in the standard, and means for locking in any set position is provided. With the motor connected to the same power source as the alternating current arc 19, the shutter can be held in positive synchronism with the light fluctuations, and at a phase angle determined by the position of the motor frame.

The use of a synchronous motor is desirable because such a motor can be locked into step only at definite angular positions which are even multiples of 90 electrical degrees, and since the optimum shutter phase positions also occur at 90° intervals, the shutter synchronism having been once established, will need no further adjustment, so long as the mechanical assembly is not disturbed. To adjust the motor initially, the motor frame is slowly revolved until the projected light on a screen shows a minimum or no discernible flicker. Locked in this position, the system provides a steady light.

The particular point in the electrical cycle at which the shutter opening should occur to provide the best phase relationship will vary with different systems, depending on factors such as the shutter frequency desired and the size and kind of openings employed in the shutter. For example, with a 90° shutter, with equal open and closed periods, rotating at 1440 R. P. M., and operating with a 60 cycle alternating current arc, minimum flicker is obtained when the shutter opening occurs within the range of 24 to 34 electrical degrees or at 90° multiples of this range, whereas a 72° shutter, in which the length of the shutter cycle is the same, but in which the open period is one and a half times as great as the closed period, should open in the range of 2 to 7 electrical degrees on the light wave, or 90° multiples of this to provide the best results. The pulsating frequency of the light source is also an influencing factor on the most appropriate shutter opening position, but this synchronization control has proven operable under all known film projection conditions.

The oscillograph curves of Figures 3, 4, and 5 are further illustrative of the advantages of this invention, and show visually the nature of the projected light from a 60 cycle alternating current high intensity arc under different conditions. The curve of Figure 3 is made without any shutter and shows four light cycles similar to Figure 2 with large intensity variations in each cycle. The curves of Figures 4 and 5 are taken of light passed by a 70° shutter operated by the synchronous motor as described, with a phase adjustment in one instance to give a maximum flicker, and in the second case to provide as little flicker as possible. The symmetry of the successive light waves for the condition of minimum flicker is in marked contrast to the irregularity of the successive light pulses in the other cases. With a minimum flicker successive light pulses are similar in shape, and all have two peaks, whereas the unsatisfactory conditions of Figure 4 show half of the light pulses with two peaks and the balance with three. Of more importance than this lack of symmetry in shape, which is caused by fluctuations in light too rapid for the eye to detect, is the fact that the quantities of light, represented by the areas under the curves, are materially different in the successive shutter openings represented by Figure 4, while they are substantially the same under the conditions represented by Figure 5. In both of these cases, the shutted is operating in absolute synchronism with the light pulses. The important difference, which is responsible for the desired reduction in flicker, is the adjustment of the phase relationship between the shutter openings and the light pulses to the optimum position represented by Figure 5.

The 60 cycle alternating current arc represents a common type of pulsating light source, and for that reason has been referred to in the examples and description herein given. It will be understood, however, that the invention is equally applicable and effective with any pulsating motion picture light source having regular cyclic variations in intensity. A direct current low intensity arc operated from a single phase rectified alternating current source with little or no filtering, and the high pressure mercury arc, give a somewhat similar pulsating light, and are operable with the system here proposed by substituting such a light source, with suitable electrical connections, for the member 19 as now shown in Fig. 1. It has already been indicated that the shutter synchronizing principle is applicable regardless of the shutter frequencies required, or the various film speeds necessary for different sizes of film, and in fact the invention appears of particular promise as applied to a 16 mm. film projection system with an alternating current arc.

The broader scope of the invention includes many modifications, and it should not be limited other than as defined in the appended claims.

We claim:

1. A motion picture projection system comprising a light source having regular cyclic variations in intensity, a shutter with equal open portions and equal closed portions for alternately intercepting and passing the light from said source, the light passing period having a duration different from and not a factor of the period of each light cycle, means for operating said shutter and moving the picture film in synchronism therewith, said latter means being adjustable to maintain each opening in said shutter in a fixed phase relationship with the light cycle.

2. A motion picture projection system comprising a light source supplied by an alternating current, a shutter with open and closed portions for alternately intercepting and passing the light from said source at equal intervals of a frequency different from and not a factor of the frequency of the alternating current, a synchronous motor operated from the same power supply as the light source for rotating said shutter and moving the picture film in synchronism therewith, and an adjustable stator on said motor whereby the rotation of said shutter can be maintained with the openings therein in a fixed phase relationship with the current supplying the light source.

3. A motion picture projection system comprising a 60 cycle alternating current arc as the light source, a shutter with open and closed portions for alternately intercepting and passing the light from said source at equal intervals of a frequency different from and not a factor of the frequency of the alternating current, a synchronous motor operated from the same power supply as the light source for rotating said shutter and moving the picture film in synchronism therewith, and means for rotating the stator of said motor to establish and fix the shutter rotation in the phase relationship with the current supply of the light source producing a minimum of flicker.

4. In a motion picture projection system having an alternating current arc as a light source, and a shutter for alternately intercepting and passing the light from said source at equal intervals of a frequency different from and not a factor of the frequency of the alternating current, means for operating said shutter comprising a synchronous motor supplied from the same power source as said arc and having an adjustable stator to establish a shutter rotation in which the shutter openings are in the phase relationship with the electrical cycle of the light source which produces in the projected light a minimum variation in quantity between successive pulses.

5. In a motion picture projection system having a 60 cycle alternating current arc as a light source, and a shutter with 90° blades adapted to alternately intercept and pass the light from said source at equal intervals of a frequency different from and not a factor of the frequency of the alternating current, means for operating said shutter comprising a synchronous motor supplied from the same power source as said arc and having an adjustable stator to establish a shutter rotation in which the shutter openings are in the phase relationship with the electrical cycle of the light source which produces in the projected light a minimum variation in quantity between successive pulses.

6. A motion picture projection system comprising a light source having regular cyclic variations in intensity, a shutter with equal open portions and equal closed portions for alternately intercepting and passing the light from said source, the light passing period having a duration different from and not a factor of the period of each light cycle, a synchronous motor for rotating said shutter and moving the picture film in synchronism therewith, and means for adjusting said motor to maintain each opening in said shutter in a fixed phase relationship with the light cycle.

FREDERICK T. BOWDITCH.
PAUL A. MARSAL.